UNITED STATES PATENT OFFICE.

WILLIAM C. BAKER, JR., OF NEW YORK, N. Y.

IMPROVEMENT IN THE MANUFACTURE OF ARTIFICIAL MARBLE AND STONE.

Specification forming part of Letters Patent No. 214,348, dated April 15, 1879; application filed March 13, 1879.

*To all whom it may concern:*

Be it known that I, WILLIAM CHAPMAN BAKER, Jr., of the city, county, and State of New York, have invented an Improvement in the Manufacture of Artificial Marble and Stone; and I hereby declare the following to be a full, clear, and exact description thereof.

The object of my invention is to enable me to produce at a small cost a beautiful imitation of different varieties of marble, which shall possess extreme hardness, combined with great strength and durability; and my invention consists in a compound formed of certain ingredients, combined and chemically treated in such a manner as to produce a hard crystallized substance which is capable of successfully resisting the action of water, frost, and fire, and is therefore especially adapted for use as a building material in any climate, and for a variety of other purposes, as will be hereinafter set forth.

I first mix together in a suitable vessel one gallon of naphtha, two ounces of sesquicarbonate of ammonia, two drams of carbonate of potash, two ounces of spermaceti, six ounces of paraffine, eight ounces of calc-spar, and, if colored marble is to be made, I add half a pound of madder to set the colors. This mixture is then thoroughly stirred until the soluble ingredients are dissolved, after which I take one quart of the solution thus prepared, and intimately mix it with one hundred gallons of water in which twenty pounds of tapioca, boiled to the consistence of paste, has been previously dissolved. I then take equal parts, more or less, of kaolin, Spanish white, Keene's or other cement, marble-dust, pulverized alum, and calcined plaster, and thoroughly and intimately mix or combine these materials with one another in a perfectly dry state, after which I add and thoroughly stir in a sufficient quantity of the last-mentioned diluted mixture or solution, until the mass has the consistence of a thick paste, which is then placed in suitable molds to give it any desired shapes, and compressed, after which it is allowed to remain until hard and dry, when, after being removed, it can be polished in the same manner as ordinary marble.

If desired, the interior surface of the mold can be coated with a layer of suitable thickness of the plastic material above described, and the remainder of it filled with a cheaper and coarser substance, the blocks or other articles thus formed having the same external appearance as if made entirely of the finer composition, and being equally as durable.

Instead of molding the composition into blocks or other articles, it may be applied to the inner or outer walls of buildings or other surfaces in a plastic state, and, after being smoothed, allowed to dry thereon.

When imitations of colored or variegated marbles are to be made, the necessary pigments or colors, or combinations thereof, are placed on a smooth surface, such as glass or other hard substance, which forms the bottom or interior of the mold. The colors are then mingled together or manipulated to produce the desired imitation of the veins or figures of natural marble, after which, if desired, the drying of the colors may be accelerated by adding a thin layer of Keene's or other cement in a dry state. The mold is then filled with the plastic composition, as before described, and allowed to remain until dry, the blocks or other articles thus made presenting a beautiful and highly ornamental appearance, and bearing a perfect resemblance to natural marble.

Any other well-known method of coloring the composition to produce the desired imitations of different marbles or plain colors may be employed, if preferred.

The chemical solution above described produces a perfect crystallization of the compound, which is thus solidified and rendered hard, durable, and capable of withstanding an immense pressure, the particles being thereby caused to adhere so closely and tenaciously together as to render the material insoluble, impervious to air and water, and capable of resisting the action of fire, frost, acids, and other disintegrating influences.

Artificial marble or stone made as above described can be used to great advantage for building-blocks, and also for an infinite variety of other purposes, such as the exterior or interior decoration of buildings, mantel-pieces, cemetery-work, monuments, flooring, sidewalks, belting-courses, trimmings, &c., it being easily and cheaply molded into any desired shapes, whereby the great expense which is incurred in cutting natural marble into the artistic and elaborate designs so frequently employed is entirely avoided, thus rendering it possible to erect buildings embellished with beautiful architectural designs at a much less cost than where natural marble or stone is employed.

What I claim as my invention, and desire to secure by Letters Patent, is—

1. An artificial marble or stone composed of kaolin, Spanish white, Keene's or other cement, marble-dust, pulverized alum, and calcined plaster, united and solidified by mixing therewith a chemical solution formed of naphtha, sesquicarbonate of ammonia, carbonate of potash, spermaceti, paraffine, calc-spar, water, and tapioca, with or without madder, substantially as and for the purpose set forth.

2. The herein-described liquid compound, consisting of naphtha, sesquicarbonate of ammonia, carbonate of potash, spermaceti, paraffine, calc-spar, water, and tapioca, with or without madder, substantially in the proportions named, for the purpose of producing the crystallization of the artificial marble or stone, as described.

Witness my hand this 7th day of March, A. D. 1879.

WILLIAM CHAPMAN BAKER, Jr.

In presence of—
   L. B. ELWOOD,
   WILLIAM A. BARNES.